Patented Nov. 4, 1947

2,430,439

UNITED STATES PATENT OFFICE 2,430,439

SULFONAMIDO PYRIMIDINES

Philip Stanley Winnek, Riverside, and Richard O. Roblin, Jr., Old Greenwich, Conn., assignors to American Cyanamid Company, New York, N. Y., a corporation of Maine No Drawing. Application October 15, 1940, Serial No. 361,256

5 Claims. (Cl. 260—239.6)

This invention relates to a new class of chemical compounds, the sulfonamido pyrimidines.

The compounds of the present invention may be represented by the following type formula:

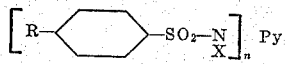

where R is a halogen, nitro, azo, amino or substituted amino group such as alkylamino, arylamino, aralkylamino, acylamino, sodium formaldehyde sulfoxylate amino or mono-aldose amino, X represents hydrogen, an alkyl group or a metal, Py is a pyrimidine substituted or unsubstituted, and $n$ is a small whole number. Numbering of the pyrimidine ring normally proceeds from one or the other of the nitrogen atoms. There are therefore 3 isomeric sulfonamido pyrimidines where the ring is unsubstituted, namely the 2, 4, and 5 derivatives. The other carbon atoms may be linked to hydrogen or may carry other substituent groups.

The compounds of the present invention are useful in a number of fields. Many of them show extraordinarily high activity against certain bacteria such as for example beta-hemolytic streptococci and pneumococci. Others, where R is amino are useful as intermediates for the production of azo dyes and other compounds.

Since there are four carbon atoms in the pyrimidine ring capable of carrying amino groups as substituents, more than one sulfonamido compound can be prepared and the present invention includes polysulfonamido pyrimidines as well as the monosulfonamido pyrimidines.

In general the compounds of the present invention are prepared by reacting a p-substituted benzene sulfonyl halide with the amino-pyrimidine desired. In the case of the sulfanilamido compounds, the para-substituent may be any one of a number of groups which are capable of being converted to an amino group. For example, it is possible to start with an N-acylsulfaniyl halide producing first the corresponding acylamino compound which can be transformed into the amino compound by hydrolysis of the acyl group. A second method is to start with a p-nitrobenzene sulfonyl halide and produce in the first step the corresponding p-nitrobenzene sulfonamido pyrimidine, followed by reduction of the nitro group if the amino group is desired. Another possibility is from a p-halogen benzene sulfonyl halide, for example, p-chlorobenzene sulfonyl chloride. The p-chlorobenzene sulfonamido pyrimidine may then be converted to the corresponding sulfanilamidopyrimidine by treatment with aqueous ammonia under pressure. Still another possibility is to start with a p-azobenzene sulfonyl halide and an aminopyrimidine followed by reduction of the azo group to an amino group. Still other possibilities of obtaining the amino group will be apparent to anyone skilled in the art.

In some cases the sulfanilamido pyrimidines may be prepared by the action of a halogen substituted pyrimidine on an $N^4$-acylsulfanilamide in the presence of an alkali such as, for example, potassium carbonate. The sulfanilamidopyrimidines are then obtained by hydrolysis of the acyl group.

The sodium formaldehyde sulfoxylate amino compound and the mono-aldose amino compounds are prepared from the corresponding amino compounds by a reaction with the alkali metal sulfoxylate solution or a mono-aldose sugar such as glucose or galactose as the case may be. In the production of the sugar derivatives it is preferable, although not essential to carry out the reaction in an organic solvent such as ethanol.

The first step in producing any of the compounds of the present invention usually involves a reaction of a sulfonyl halide with an amino compound. This sets free a hydrogen halide and it is therefore desirable where a good yield is to be obtained, to provide a basic substance which will unite with the hydrogen halide evolved. This can be effected simply by carrying out the reaction in aqueous solution and adding a suitable amount of sodium hydroxide, or the reaction may be effected in an organic liquid such as dioxane, acetone, benzene and the like. Some organic solvents such as triethyl amine and pyridine are themselves basic, and may be used. In such cases, however, the compound of the organic base with the the halogen acid is somewhat acidic and if desired a more neutral reaction mixture may be obtained by the addition of a stronger base such as caustic alkali.

The hydrogen of the sulfonamido group is an acidic hydrogen and is capable of reacting with strong bases to form salts. The alkali metal salts can be produced directly by a reaction of the compounds with an alkali metal hydroxide in concentrated aqueous solution. Warming on a steam bath is advantageous in bringing about salt formation. The salt can then be crystallized out on cooling, or if desired, crystallization from absolute alcohol can be effected. Salts of the heavy metals such as gold, copper, iron, and the like, can be obtained by a reaction of an aqueous solution of the alkali metal salts with a solution of the desired heavy metal salt. The salts of the

EXAMPLE 1

5-(N⁴-acetylsulfanilamido)-2,4-dihydroxy-pyrimidine

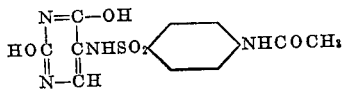

6 parts of 5-amino-2,4-dihydroxy-pyrimidine were suspended in 200 parts of water by stirring and the mixture warmed to 60° C. 15 parts (assuming 73% purity of the acid chloride) of p-acetylaminobenzene sulfonyl chloride were added gradually. The pH of the reaction mixture was maintained as close as possible to 7 by adding sodium hydroxide solution from time to time. The temperature was finally raised to 80° C. and maintained there for one-half hour. The reaction mixture was allowed to stand over night. The 5-(p-acetyl-aminobenzene sulfonamido)-2,4-dihydroxy-pyrimidine which had precipitated was filtered off and washed with water.

EXAMPLE 2

5-(sulfanilamido)-2,4-dihydroxy-pyrimidine

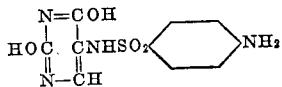

12 parts of 5-(p-acetylaminobenzenesulfonamido)2,4-dihydroxy-pyrimidine were dissolved in 80 parts of water containing 14 parts of sodium hydroxide and the solution was boiled gently for 20 minutes. A small amount of decolorizing charcoal was then added and the boiling was continued for 5 minutes. It was then filtered, cooled, diluted with 200 parts of water and neutralized with dilute hydrochloric acid. The 5-(sulfanilamido)-2,4-dihydroxy-pyrimidine separated as a light brown precipitate. It was purified by crystallization from hot water after treatment with decolorizing charcoal. It finally crystallized as pure white needles.

EXAMPLE 3

5-(p-nitrobenzene sulfonamido)-2,4-dihydroxy-pyrimidine

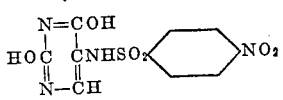

16 parts of 5-amino-2,4-dihydroxy-pyrimidine were made into a thick slurry with 32 parts of dry pyridine. 35 parts of p-nitrobenzene sulfonyl chloride were added gradually with stirring. The temperature was maintained at 40° C.±5° C. The reaction mixture was then heated on a steam bath with stirring for 2 hours. 7.5 parts of sodium hydroxide dissolved in 100 parts of water were then added slowly. Stirring and heating on the steam bath was continued for 3 hours, hot water being added from time to time to maintain the volume. The reaction mixture was then cooled and the pH adjusted to 7 by addition of a few drops of dilute hydrochloric acid. The yellow precipitate of 5-(p-nitrobenzenesulfonamido)-2,4-dihydroxy-pyrimidine was filtered off and washed with water. It was purified by dissolving in cold dilute alkali, stirring the solution in the cold for 1 hour with decolorizing charcoal, filtering and neutralizing with dilute hydrochloric acid. The 5-(p-nitrobenzene-sulfonamido)-2,4-dihydroxy-pyrimidine precipitated as a light yellow colored solid. It was filtered off and washed with water. It may be reduced in very dilute alcoholic hydrochloric acid with iron dust to give 5-(sulfanilamido)-2,4-dihydroxy-pyrimidine identical with the product obtained in Example 2.

EXAMPLE 4

5-(N⁴-acetylsulfanilamido)-pyrimidine

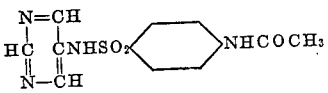

20 parts of 5-aminopyrimidine were made into a slurry with 45 parts of anhydrous pyridine. 47 parts of N⁴-acetylsulfanilyl chloride were added gradually with vigorous stirring. The reaction mixture was heated on a steam bath 1 hour. It was then cooled and diluted with 75 parts of water containing 0.9 part of sodium hydroxide. The crude 5-(N⁴-acetyl-sulfanilamido) pyrimidine separated out as a brown solid. It was washed with water.

EXAMPLE 5

5-sulfanilamido-pyrimidine

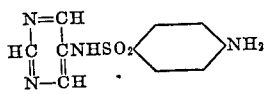

2.5 parts of 5-(N⁴-acetylsulfanilamido)-pyrimidine were dissolved in 25 parts of water containing 3 parts of sodium hydroxide and the solution boiled gently for one-half hour. It was then filtered, cooled and neutralized with dilute hydrochloric acid. The crude 5-sulfanilamido-pyrimidine separated as a brown solid. It was purified by crystallization from water using decolorizing charcoal to remove color and impurities. The hydrolysis of the 5-(N⁴-acetylsulfanilamido)-pyrimidine to give 5-sulfanilamido-pyrimidine also can be carried out using 10% hydrochloric acid as hydrolyzing agent.

EXAMPLE 6

4-(p-nitrobenzene sulfonamido)-pyrimidine

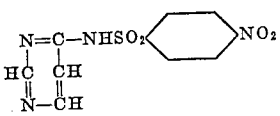

Four parts of 4-amino-pyrimidine were covered with 10 parts of anhydrous pyridine and treated with 9 parts of p-nitrobenzenesulfonyl chloride. The mixture was stirred well and warmed on the steam. When the mixture had cooled it was added to 100 parts of water containing 1.7 parts of sodium hydroxide and 50 parts of the liquor distilled off in vacuo. To the residue in the distilling flask was added 2 parts of sodium hydroxide dissolved in 100 parts of water and 20 parts of distillate collected.

The residual liquor was filtered, cooled and acidified. The 4-(p-nitrobenzenesulfonamido)-pyrimidine which separated was recrystallized from a hot mixture of acetic acid and water.

EXAMPLE 7

*4-(sulfanilamido)-pyrimidine*

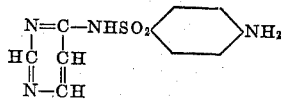

Four and one half parts of 4-(p-nitrobenzenesulfonamido)-pyrimidine were suspended in 75 parts of 95% alcohol and to this was added 1 part of concentrated hydrochloric acid. The mixture was heated to reflux with stirring and 17 parts of iron powder were added. After refluxing for 14 hours the mixture was made slightly basic and filtered hot. The iron was leached with several portions of boiling alcohol and the combined filtrate and leachings were evaporated on the steam bath.

The 4-(sulfanilamido)-pyrimidine was recrystallized from boiling water with the addition of decolorizing charcoal.

EXAMPLE 8

*4-($N^4$-acetylsulfanilamido)-pyrimidine*

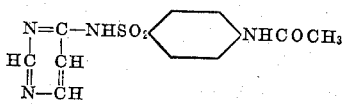

Thirty parts of 4-amino pyrimidine were made into a slurry by adding 70 parts of anhydrous pyridine. 70 parts of $N^4$-acetylsulfanilyl chloride were added gradually with vigorous stirring. The reaction mixture was heated on a steam bath for 1 hour. It was then cooled and diluted with 1000 parts of water containing 13 parts of sodium hydroxide. The crude 4-($N^4$-acetylsulfanilamido)-pyrimidine separated as a brown solid. It was filtered off and washed with water.

EXAMPLE 9

*4-sulfanilamido-pyrimidine*

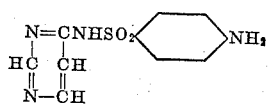

Four parts of 4-($N^4$-acetylsulfanilamido)-pyrimidine were dissolved in 40 parts of water containing 5 parts of sodium hydroxide and the solution boiled gently for one-half hour. It was then filtered, cooled and neutralized with dilute hydrochloric acid. The crude 4-sulfanilamido-pyrimidine separated as a light brown solid. It was purified by crystallization from water using decolorizing charcoal to remove color and impurities. The pure 4-sulfanilamido-pyrimidine was identical with that obtained in Example 7. The hydrolysis of the 4-($N^4$-acetylsulfanilamido)-pyrimidine to yield 4-sulfanilamido-pyrimidine can also be carried out using 10% hydrochloric acid as hydrolyzing agent.

EXAMPLE 10

*2-(p-nitrobenzenesulfonamido)-pyrimidine*

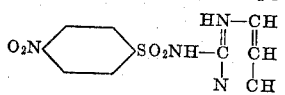

5.4 parts of 2-amino-pyrimidine were covered with 15 parts of anhydrous pyridine. The reaction mixture was treated with 14 parts of p-nitrobenzenesulfonyl chloride and the whole heated briefly on the steam bath and let stand 45 minutes at room temperature. To the reaction mixture were added 80 parts of hot alcohol and the precipitate was filtered off and washed with water. The solid was dissolved in dilute caustic solution and the solution was filtered, cooled and acidified. The 2-(p-nitrobenzenesulfonamido)-pyrimidine precipitated and was collected.

EXAMPLE 11

*2-(sulfanilamido)-pyrimidine*

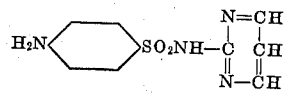

The crude 2-(p-nitrobenzenesulfonamido)-pyrimidine from the preceding example was suspended in 130 parts alcohol and 1.5 parts of concentrated hydrochloric acid were added. The suspension was then heated to reflux and 30 parts of iron powder were added with mechanical stirring. The mixture was refluxed and stirred for 24 hours with occasional addition of concentrated hydrochloric acid. The reaction mixture was then made slightly basic and filtered hot and the residues were extracted with several portions of boiling alcohol. The filtrate and wash solutions were combined and evaporated. The 2-(sulfanilamido)-pyrimidine was recrystallized from boiling water with decolorizing charcoal added.

EXAMPLE 12

*2-($N^4$-acetylsulfanilamido)-pyrimidine*

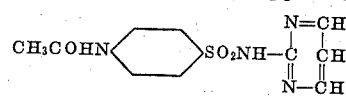

20 parts of 2-aminopyrimidine were partially dissolved and partially suspended in 45 parts of anhydrous pyridine. 47 parts of $N^4$-acetylsulfanilyl chloride were added gradually with vigorous stirring. The reaction mixture was heated on a steam bath 1 hour. It was then cooled and diluted with 750 parts of water containing 9 parts of sodium hydroxide. The crude 2-($N^4$-acetylsulfanilamido)-pyrimidine separated as a brown solid. It was filtered off and washed with water.

EXAMPLE 13

*2-sulfanilamido-pyrimidine*

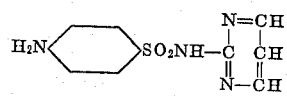

15 parts of 2-($N^4$-acetylsulfanilamido)-pyrimidine were dissolved in 150 parts of water containing 17.5 parts of sodium hydroxide and the solution boiled gently for 25 minutes. A small amount of decolorizing charcoal was added and the boiling was continued for 5 minutes. The solution was then filtered, cooled and neutralized with dilute hydrochloric acid. The crude 2-sulfanilamido-pyrimidine separated as a light brown solid. It was purified by crystallization from water using decolorizing charcoal to remove color. The pure 2-sulfanilamido-pyrimidine was identical with that prepared in Example 11. The hydrolysis of the 2-($N^4$-acetylsulfanilamido)-pyrimidine also can be carried out using 10% hydrochloric acid as hydrolyzing agent.

EXAMPLE 14

*4-p-nitrobenzenesulfonamido-2-methoxy-pyrimidine*

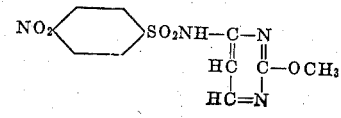

15 parts of 4-amino-2-methoxypyrimidine were dissolved in 30 parts of anhydrous pyridine by warming. The solution was cooled with vigorous shaking and 30 parts of p-nitrobenzenesulfonyl chloride were added. The mixture was then stirred and warmed on the steam bath. After cooling to room temperature, 250 parts of warm alcohol were added. The mixture was cooled, and the solid which had separated was removed by filtration. A further precipitate was obtained by the addition of water to the filtrate. This precipitate was washed with cold water and combined with the previously obtained solid. The combined products were dissolved in cold base and clarified with decolorizing charcoal. The 4-p-nitrobenzene-sulfonamido-2-methoxypyrimidine was then precipitated from the clarified filtrate by acidification, and recrystallized from acetic acid.

EXAMPLE 15

*4-sulfanilamido-2-methoxypyrimidine*

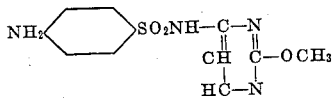

7 parts of 4-p-nitrobenzenesulfonamido-2-methoxypyrimidine were suspended in 100 parts of 95% ethanol containing 1.5 parts of concentrated hydrochloric acid. The mixture was heated and stirred and 25 parts of iron powder were added gradually. After refluxing for 16 hours the mixture was made slightly basic and filtered hot. The residue was extracted with several portions of hot alcohol and the filtrates combined and evaporated on the steam bath. The 4-sulfanilamido-2-methoxy-pyrimidine was recrystallized from dilute alcohol, using decolorizing charcoal to decolorize it.

EXAMPLE 16

*2-(p-nitrobenzene sulfonamido)-4-methoxypyrimidine*

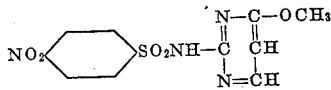

Ten parts of 2-amino-4-methoxypyrimidine were dissolved by warming in 20 parts of anhydrous pyridine. The solution was cooled and treated with 20 parts of p-nitrobenzene sulfonyl chloride. The mixture was then stirred and warmed on the steam bath. After cooling to room temperature, 250 parts of warm alcohol were added. The mixture was cooled, and the solid which had separated was removed by filtration. A further precipitate was obtained by the addition of water to the filtrate. This precipitate was washed with cold water and combined with the previously obtained solid. The combined products were dissolved in cold base and clarified with decolorizing charcoal. The 2-(p-nitrobenzene sulfonamido)-4-methoxypyrimidine was then precipitated from the clarified filtrate by acidification, and recrystallized from acetic acid.

EXAMPLE 17

*2-sulfanilamido-4-methoxypyrimidine*

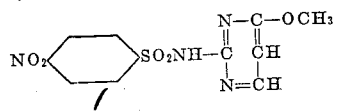

4.5 parts of 2-(p-nitrobenzenesulfonamido)-4-methoxypyrimidine were suspended in 75 parts of 95% ethanol containing 1 part of concentrated hydrochloric acid. The mixture was heated and stirred and 17 parts of iron powder were added gradually. After refluxing for 16 hours the mixture was made slightly basic and filtered hot. The residue was extracted with several portions of hot alcohol and the filtrates combined and evaporated on the steam bath. The 2-sulfanilamido-4-methoxypyrimidine was recrystallized from dilute alcohol, using decolorizing charcoal to decolorize it.

EXAMPLE 18

*2-(p-nitrobenzene sulfonamido)-4,6-dimethylpyrimidine*

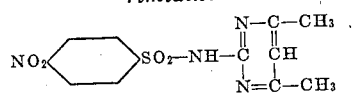

Six parts of 2-amino-4,6-dimethylpyrimidine were dissolved by warming in 10 cc. of anhydrous pyridine. The solution was cooled and to it was added 12 parts of p-nitrobenzenesulfonyl chloride. The mixture was then stirred and warmed on the steam bath. After cooling to room temperature, 250 parts of warm alcohol were added. The mixture was cooled, and the solid which had separated was removed by filtration. A further precipitate was obtained by the addition of water to the filtrate. This precipitate was washed with cold water and combined with the previously obtained solid. The combined products were dissolved in cold base and clarified with decolorizing charcoal. The 2-(p-nitrobenzene sulfonamido)-4,6-dimethylpyrimidine was then precipitated from the clarified filtrate by acidification and recrystallized from acetic acid.

EXAMPLE 19

*2-sulfanilamido-4,6-dimethylpyrimidine*

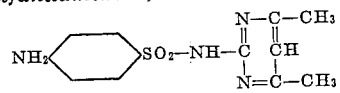

Three parts of 2-p-nitrobenzene sulfonamido-4,6-dimethylpyrimidine were suspended in 40 parts of 95% ethanol containing 1 part of concentrated hydrochloric acid. The mixture was heated to reflux with stirring and 14 parts of iron powder were added gradually. After refluxing for 16 hours the mixture was made slightly basic and filtered hot. The residue was extracted with several portions of hot alcohol and the filtrates combined and evaporated on the steam bath. The 2-sulfanilamido-4,6-dimethylpyrimidine was recrystallized from dilute alcohol, using decolorizing charcoal to decolorize it.

EXAMPLE 20

*2-N¹-methyl sulfanilamidopyrimidine*

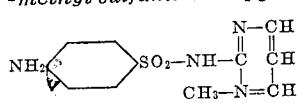

Four parts of 2-methylaminopyrimidine were added to 10 parts of anhydrous pyridine. To this were added 9 parts of p-nitrobenzenesulfonyl chloride. The resulting mixture was stirred well and warmed on the steam bath. When the reaction mixture had cooled, it was added to 150 parts of water. The precipitate of 2-p-nitrobenzene-sulfonamido methylpyrimidine was separated and recrystallized from glacial acetic acid. The 2-N¹-methyl sulfanilamidopyrimidine was obtained by reduction of the nitro group as described in Example 7. It was recrystallized from ethanol with the addition of decolorizing charcoal.

EXAMPLE 21
4-p-chlorobenzene sulfonamidopyrimidine

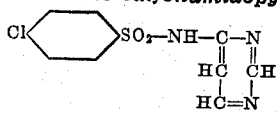

16 parts of p-chlorobenzenesulfonyl chloride were added to 7 parts of 4-aminopyrimidine in 16 parts of dry pyridine. The reaction mixture was then heated on the steam bath for a short time. After cooling, water was added and the precipitated 4-p-chlorobenzene sulfonamidopyrimidine removed by filtration. It was then recrystallized from acetic acid.

For conversion to 4-sulfanilamidopyrimidine, 5 parts of 4-p-chlorobenzene sulfonamidopyrimidine were heated with 20 parts of concentrated aqueous ammonia containing ¼ part of cuprous chloride. The reaction was carried out in a closed tube at 150–175° C. for 14 hours. On evaporation of the excess ammonia, 4-sulfanilamido pyrimidine was obtained.

By the substitution of amines such as methylamine, aniline and benzyl amine for ammonia in the above process, substituted aminobenzene sulfonamidopyrimidines such as 4-$N^4$-methylsulfanilamidopyrimidine, 4-$N^4$-phenylsulfanilamidopyrimidine, and 4-$N^4$-benzylsulfanilamidopyrimidine may be obtained.

EXAMPLE 22
Azobenzene-p,p'-(di-2-sulfonamidopyrimidine)

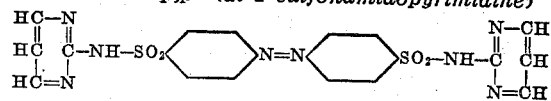

To 9.5 parts of 2-aminopyrimidine in 65 parts of dry pyridine was added 20 parts of azobenzene-p,p'-disulfonyl chloride. When the reaction was completed, the reaction mixture was added to 300 parts of water. The precipitated azobenzene-p,p'-(di-2-sulfonamidopyrimidine) was removed by filtration and washed with water. For purification it was dissolved in alkali and reprecipitated with acid. By reduction with sodium hydrosulfite in alkaline solution, 2-sulfanilamidopyrimidine was obtained.

EXAMPLE 23
2-$N^4$-acetylsulfanilamido-4,6-dimethylpyrimidine

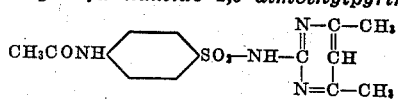

A mixture of 20 parts of $N^4$-acetylsulfanilamide, 1 part of copper powder, 12 parts of anhydrous potassium carbonate and 16 parts of 2-chloro-4,6-dimethylpyrimidine was heated for 1 to 2 hours at 225° C. The melt was dissolved in hot water and filtered. On acidification 2-$N^4$-acetylsulfanilamido-4,6-dimethylpyrimidine was obtained. By alkaline hydrolysis it was converted to 2-sulfanilamido-4,6-dimethylpyrimidine identical with that described in Example 19.

EXAMPLE 24
4'(N-(2-pyrimidyl)-sulfonamido)-2-azo-7-acetylamino-1-hydroxy naphthalene-3,6-disulfonic acid

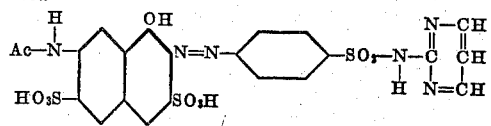

Twenty-five parts of 2-sulfanilamidopyrimidine were dissolved on 25 parts of concentrated hydrochloric acid diazotized with a solution of 6.9 parts of sodium nitrite in water solution. The diazo solution was added to a strong carbonate solution of 36 parts of 7-acetylamino-1-hydroxy-naphthalene-3,6-disulfonic acid. After several hours stirring, the solution was acidified with acetic acid and precipitated with salt.

The orange precipitate of 4'-(N-(2-pyrimidyl) sulfonamido)-2-azo-7-acetylamino-1-hydroxy naphthalene-3,6-disulfonic acid may be recrystallized from methanol. The water soluble sodium salt may be precipitated from aqueous solution by the addition of absolute alcohol.

EXAMPLE 25
5-($N^4$-acetylsulfanilamido)-2-acetylamino-pyrimidine

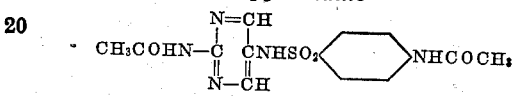

14 parts of 2-acetylamino-5-aminopyrimidine were made into a slurry with 25 parts of anhydrous pyridine. 25 parts of $N^4$-acetylsulfanilyl chloride were added gradually with vigorous stirring. The reaction mixture was heated on a steam bath for one hour. It was then cooled and diluted with 150 parts of water. The crude 5-($N^4$-acetylsulfanilamido)-2-acetylamino pyrimidine separated out as a yellow solid. It was filtered off and washed with water.

EXAMPLE 26
5-sulfanilamido-2-aminopyrimidine

15 parts of 5-($N^4$-acetylsulfanilamido)-2-acetylaminopyrimidine were dissolved in 150 parts of water containing 20 parts of sodium hydroxide and the solution was boiled gently for 25 minutes. A small amount of decolorizing charcoal was added and the boiling was continued for five minutes. The solution was then filtered, cooled and neutralized with dilute hydrochloric acid. The crude 5-sulfanilamido-2-aminopyrimidine separated as a light brown solid. It was purified by crystallization from water using decolorizing charcoal to remove the color.

EXAMPLE 27
5-(p-nitrobenzenesulfonamido)-2-methoxy-pyrimidine

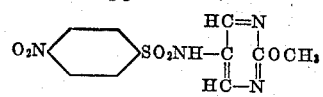

12.5 parts of 5-amino-2-methoxypyrimidine were suspended in 25 parts of anhydrous pyridine. 25 parts of p-nitrobenzenesulfonyl chloride were gradually added with vigorous stirring. The reaction mixture was then warmed on the steam bath for 1 hour. It was cooled and diluted with 100 parts of water. The crude 5-(p-nitrobenzene sulfonamido)-2-methoxypyrimidine separated as a yellow solid. It was purified by crystallization from acetic acid.

EXAMPLE 28
5-sulfanilamido-2-methoxypyrimidine

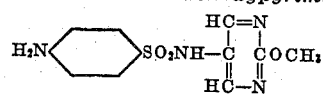

5 parts of 5-(p-nitrobenzenesulfonamido)-2-methoxypyrimidine were suspended in 75 parts of 95% ethanol containing 1 part of concentrated hydrochloric acid. The mixture was heated and stirred and 20 parts of iron powder were added gradually. After refluxing for 18 hours the mixture was made slightly basic and filtered hot. The residue was extracted with several portions of hot ethanol and the filtrates combined and evaporated on the steam bath. The 5-sulfanilamido-2-methoxypyrimidine was crystallized from dilute alcohol, using decolorizing charcoal to remove the color.

Example 29

*2-(N⁴-acetylsulfanilamido)-4-methylpyrimidine*

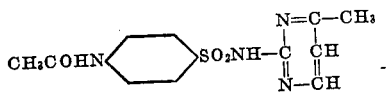

36 parts of 2-amino-4-methylpyrimidine were suspended in 85 parts of anhydrous pyridine and 97 parts of N⁴-acetylsulfanilyl chloride were added gradually with vigorous stirring, the temperature being maintained below 55° C. The reaction mixture was stirred for 1½ hours at 40° C. and the 2-(N⁴-acetylsulfanilamido)-4-methoxypyrimidine then precipitated by the slow addition of 300 parts of water. The product was washed with water and purified by dissolving in sodium hydroxide solution, treating with decolorizing charcoal and filtering. The purified 2-(N⁴-acetylsulfanilamido)-4-methylpyrimidine was precipitated by neutralizing the filtrate with acetic acid.

Example 30

*2-sulfanilamido-4-methylpyrimidine*

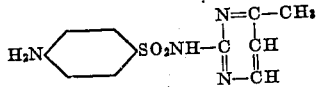

70 parts of 2-(N⁴-acetylsulfanilamido)-4-methylpyrimidine were dissolved in 210 parts of water containing 23 parts of sodium hydroxide. The solution was boiled gently for 45 minutes and then cooled. A white precipitate of the sodium salt of 2-sulfanilamido-4-methylpyrimidine crystallized out. 42 parts of this sodium salt was dissolved in 300 parts of water and stirred with decolorizing charcoal. The solution was then filtered and the 2-sulfanilamido-4-methylpyrimidine precipitated by neutralizing the filtrate with acetic acid.

Example 31

*2(N⁴-acetylsulfanilamido)-4-ethoxypyrimidine*

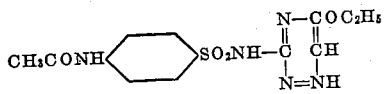

12 parts of 2-amino-4-ethoxypyrimidine were suspended in 22 parts of dry pyridine. To the stirred suspension were added 22.7 parts of N⁴-acetylsulfanilyl chloride at a temperature of 55 to 60° C. The reaction mixture was then stirred for one hour at 50 to 60° C. and precipitated by the addition of 100 parts of 30% acetic acid. The precipitate was collected and dried. 14 parts of dry 2-(N⁴-acetylsulfanilamido)-4-ethoxypyrimidine was obtained. It was purified by treatment of a solution of the sodium salt with decolorizing charcoal and precipitating of the clarified filtrate with dilute acid.

Example 32

*2-sulfanilamido-4-ethoxypyrimidine*

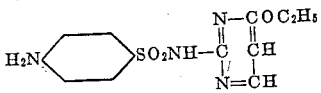

To a solution of 4.2 parts of solid caustic in 42 parts of water were added 14 parts of 2-(N⁴-acetylsulfanilamido)4-ethoxypyrimidine. The clear solution was boiled gently for one hour, the volume being maintained by the addition of water from time to time. The hydrolyzed solution was diluted with 150 parts of water and clarified by stirring with decolorizing charcoal. The colorless filtrate was precipitated with dilute acid and the 2-sulfanilamido-4-ethoxypyrimidine filtered off, and purified by recrystallization from alcohol or from the mono-ethyl ether of ethylene glycol.

Example 33

*2,5-di(d-nitrobenzenesulfonamido) pyrimidine*

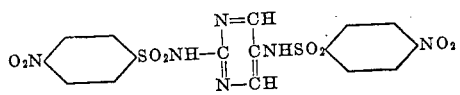

11 parts of 2,5-diamino pyrimidine were suspended in 50 parts of anhydrous pyridine. 50 parts of p-nitrobenzenesulfonyl chloride were added gradually with vigorous stirring. The reaction mixture was then stirred for 1½ hours with heating. It was cooled and diluted with 250 parts of water. The crude 2,5-di(p-nitrobenzenesulfonamido)pyrimidine separated as a yellow solid. It was purified by crystallization from acetic acid.

Example 34

*2,5-disulfanilamidopyrimidine*

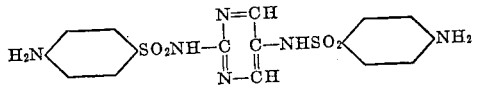

7 parts of 2,5-di(p-nitrobenzenesulfonamido) pyrimidine were suspended in 150 parts of 95% ethanol containing 2 parts of concentrated hydrochloric acid. The mixture was heated and stirred and 40 parts of iron dust were added gradually. After refluxing for 18 hours the reaction mixture was made slightly basic and filtered hot. The residue was extracted with several portions of hot ethanol and the filtrates combined and evaporated under reduced pressure. The 2,5-disulfanilamidopyrimidine so obtained was crystallized from alcohol using decolorizing charcoal to remove color.

Example 35

*2-(p-nitrobenzenesulfonamido)-5-chloropyrimidine*

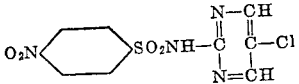

One part of 2-amino-5-chloropyrimidine and 2 parts of p-nitrobenzene sulfonyl chloride were mixed and suspended in 2 parts of anhydrous pyridine. The mixture was warmed slowly with stirring to 130° C. and kept at 130–140° C. for thirty minutes. The reaction was then cooled and broken up with water. The precipitated crude 2-(p-nitrobenzenesulfonamido)-5-chloropyrimidine was filtered off. The material was purified by treatment of its alkaline solution with decolorizing carbon, filtration, and precipitation of the clarified solution by the addition of dilute acid.

EXAMPLE 36

2-sulfanilamido-5-chloropyrimidine

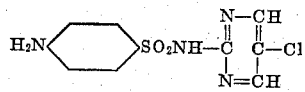

To the reaction mixture prepared by the addition of 24 parts of iron powder to 17 parts of 5% acetic acid was added 12 parts of 2-(p-nitrobenzenesulfonamido)-5-chloropyrimidine. Water was added to permit stirring and the reaction mixture was stirred and heated at 90-95° C. for one hour. The reduction mixture was then cooled, made thoroughly alkaline and then filtered. The filtrate was clarified with decolorizing carbon and the 2-sulfanilamido-5-chloropyrimidine was precipitated by acidification. The pure white product could be further purified by recrystallization from a large volume of ethanol or isopropanol.

EXAMPLE 37

Sodium salt of 2-sulfanilamidopyrimidine

The sodium salt is prepared by adding 2-sulfanilamidopyrimidine to the equivalent amount of sodium hydroxide dissolved in a very small volume of water. The mixture is warmed on a steam bath until solution is complete. Absolute alcohol and ether are then added and the sodium salt is precipitated as a white crystalline product. It is readily soluble in water.

Other alkali metal salts can be prepared in a similar manner by using the appropriate alkaline hydroxide.

EXAMPLE 38

Copper salt of 2-sulfanilamidopyrimidine

The copper salt of 2-sulfanilamidopyrimidine is prepared by adding slowly with stirring an aqueous solution of the sodium salt of 2-sulfanilamidopyrimidine to a solution containing an equivalent amount of copper chloride. The copper salt of 2-sulfanilamidopyrimidine separates as a solid.

Salts of other heavy metals, as for example, the gold, lead and iron salts are formed by reacting the sodium salt of 2-sulfanilamidopyrimidine in aqueous solution with a suitable soluble salt of the metal desired. The desired product is obtained usually as a precipitate.

In the examples where an acylamino compound was prepared, the acetylamino derivative is described because this is the cheapest and simplest acyl compound available. The invention, however, is not limited to any particular acyl derivative, but any other such as propionyl, butyryl, and the like, can be prepared.

The mono-aldose derivatives of the amino compounds of the present invention are in most instances water-soluble. These compounds may be prepared by refluxing compounds containing free amino groups with a mono-aldose sugar such as glucose or galactose in ethanol. The materials gradually go into solution and on cooling the alcoholic solutions the sugar derivatives crystallize out.

The complex resulting from the reaction of a sulfanilamidopyrimidine and glucose, for example, may be a compound of the anil or Schiff base type having the probable formula:

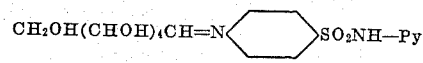

where Py represents a pyrimidine, or it may be a compound having the probable formula:

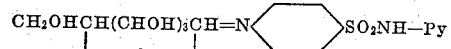

where Py again represents a pyrimidine, or it may be a mixture of the two types in equilibrium.

While the present application is not broadly limited to any particular location of the sulfonamido group or groups on the pyrimidine ring, we have found that the majority of the compounds showing outstanding therapeutic activity are sulfonamide compounds in which the sulfonamide group is attached to either the 2 or 5 carbon atom in the pyrimidine nucleus or to both. Most of the therapeutically active compounds come under the formula:

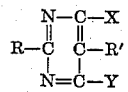

in which R or R' may be hydrogen, amino, p-aminobenzene sulfonamido, p-acylaminobenzene sulfonamido, or p-azobenzene sulfonamido, and salts thereof, but at least one of the R and R' groups is a benzenesulfonamido group, X is hydrogen, alkyl, or alkoxy, and Y is hydrogen, alkyl, or alkoxy.

The therapeutically active compounds which are covered by the present invention can be administered either by mouth or in the form of their alkali metal salts parenterally. Administered by mouth they are preferably tableted with suitable diluent materials such as starch and the like, and in such form are effective against many bacterial infections. It is an advantage of the present invention that some of the compounds are not only highly effective against the bacterial infections for which sulfonamide drugs are commonly used such as those due to streptococcus, staphylococcus, gonococcus, meningococcus, pneumococcus, but are also effective against Friedlander's bacillus. Infections of this organism have hitherto not been susceptible to successful treatment by sulfonamide drugs.

The therapeutic activity of the compounds of the present invention which are active will of course vary from compound to compound and not all of them are equally effective against all diseases.

The present application is in part a continuation of our copending application Serial No. 321,666 filed March 1, 1940.

We claim:

1. A sulfanilamido pyrimidine of the following formula:

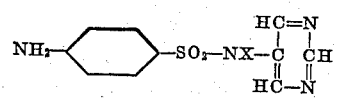

in which X is a member of the group consisting of hydrogen, alkyl, and metals.

2. A sulfanilamido pyrimidine of the following formula:

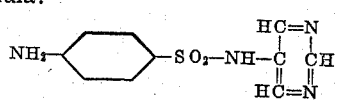

3. A 5-sulfanilamido-2-amino pyrimidine.

4. A p-substituted benzene sulfonamido pyrimidine compound having the following formula:

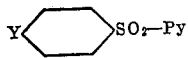

in which Y is a radical of the group consisting of $NH_2$, and radicals hydrolyzable to $NH_2$ and Py is a 5-aminopyrimidine radical, the linkage to the $SO_2$ being through the 5-amino group.

5. A 5-sulfanilamido pyrimidine.

PHILIP STANLEY WINNEK.
RICHARD O. ROBLIN, JR.

REFERENCES CITED

The following references are of record in the file of this patent:

UNITED STATES PATENTS

| Number | Name | Date |
| --- | --- | --- |
| 1,867,088 | Ossenbeck | July 12, 1932 |
| 2,097,414 | Kharasch | Oct. 26, 1937 |
| 2,202,933 | Tisza | June 4, 1940 |
| 1,898,431 | Dressel | Feb. 21, 1933 |

FOREIGN PATENTS

| Number | Country | Date |
| --- | --- | --- |
| 512,145 | Great Britain | Aug. 30, 1939 |
| 482,576 | Great Britain | Mar. 28, 1938 |
| 486,449 | Great Britain | June 2, 1938 |

OTHER REFERENCES

Journal Amer. Chem. Soc., vol. 61, pp. 2032-3, Aug. 1939.

Journal Pharmaceutical Soc. Japan, vol. 59, No. 7, July–Aug. 1939, pp. 155–158.

Journal Applied Chem. (U. S. S. R., vol. XI, pp. 316–327 (Feb. 1938).

Journal Indian Chem. Soc., vol. 14, Dec. 1937, pp. 733–5.

Biochem. Journal, May 1937, vol. 31, #5, pages 724–730.

Journal Fur Praktische Chemie (2), vol. 77 (1908), pp. 369–382. Gelmo.

Lancet, May 28, 1938, pp. 1210–1212.

Beilstein, Organische Chemie, Vierte Auflage, vol. 24, pp. 81 and 314.

Chemical Reviews, vol. 27, #1, Aug. 1940, pp. 87, 103–4, 107–110, 115, 173, 182, of the "Reprint."